United States Patent
Marra (10) Patent No.: US 8,832,570 B1
(45) Date of Patent: Sep. 9, 2014

(54) REPRESENTING A GROUP IDENTITY IN A SOCIAL NETWORK

(75) Inventor: Gregory Matthew Marra, San Francisco, CA (US)

(73) Assignee: Google Inc., Mountain View, CA (US)

( * ) Notice: Subject to any disclaimer, the term of this patent is extended or adjusted under 35 U.S.C. 154(b) by 203 days.

(21) Appl. No.: 13/335,853

(22) Filed: Dec. 22, 2011

(51) Int. Cl.
*G06F 3/00* (2006.01)

(52) U.S. Cl.
USPC .......... 715/758; 345/619; 382/118; 382/298; 705/319; 707/723; 709/204; 709/206; 709/217; 709/219; 715/753; 715/759

(58) Field of Classification Search
USPC .............. 345/619; 382/118, 298; 705/319; 707/723; 709/204, 206, 217, 219; 715/753, 758, 759
See application file for complete search history.

(56) References Cited

U.S. PATENT DOCUMENTS

| | | | | |
|---|---|---|---|---|
| 7,580,568 B1 * | 8/2009 | Wang et al. | ................... | 382/173 |
| 2006/0061598 A1 * | 3/2006 | Mino et al. | ................... | 345/629 |
| 2008/0310675 A1 * | 12/2008 | O'Brien | ........................ | 382/100 |
| 2009/0254859 A1 * | 10/2009 | Arrasvuori et al. | ........... | 715/810 |
| 2009/0256678 A1 * | 10/2009 | Ryu | ............................. | 340/5.83 |
| 2012/0134595 A1 * | 5/2012 | Fonseca et al. | ................ | 382/195 |
| 2012/0150973 A1 * | 6/2012 | Barak | ........................... | 709/206 |
| 2012/0297038 A1 * | 11/2012 | Mei et al. | ...................... | 709/223 |
| 2013/0073976 A1 * | 3/2013 | Mcdonald et al. | ............. | 715/739 |

* cited by examiner

*Primary Examiner* — Liangche A Wang
*Assistant Examiner* — Johnny Aguiar
(74) *Attorney, Agent, or Firm* — IP Spring (57) ABSTRACT

Embodiments generally relate to representing a group identity in a social network. In one embodiment, a method includes obtaining a plurality of photos associated with a plurality of users participating in a group activity, and selecting a representative photo from the plurality of photos, wherein the representative photo represents a group of the plurality of users. The method also includes associating the representative photo with the group of the plurality of users.

8 Claims, 4 Drawing Sheets

333
REPRESENTING A GROUP IDENTITY IN A SOCIAL NETWORK

TECHNICAL FIELD

Embodiments relate generally to social networks, and more particularly to representing a group identity in a social network.

BACKGROUND

Messaging applications such as email applications, group text messaging applications, and private messaging applications enable users to communicate with each other. Such messaging applications allow messaging for individual users and multiple users. When a given user sends a message to another user, the messaging thread may include the name and a photo of the sending user. This facilitates a recipient user in recognizing the sending user. To enable a messaging thread to include a photo of the sending user, the sending user typically goes through a series of steps in order to use a particular photo in messaging threads. For example, a user may access a particular folder containing photos, select a desired photo, and then upload the photo in order to use the photo in the messaging system. Once set up, the messaging system may then include the photo in future messaging threads.

SUMMARY

Embodiments generally relate to representing a group identity in a social network. In one embodiment, a method includes obtaining a plurality of photos associated with a plurality of users participating in a group activity, and selecting a representative photo from the plurality of photos, where the representative photo represents a group of the plurality of users. The method also includes associating the representative photo with the group of the plurality of users.

In one embodiment, the plurality of users are participating in a group messaging thread, and the group messaging thread is at least one of a group text messaging thread, a group conversation thread, and a group email thread. In one embodiment, the plurality of photos is obtained from a social network. In one embodiment, one or more of the photos have tags associated with the plurality of users. In one embodiment, the selecting of the representative photo comprises ranking the plurality of photos based on predetermined criteria. In one embodiment, the predetermined criteria comprise a percentage of users in each photo who are associated with the group activity. In one embodiment, the predetermined criteria comprise a proximity of faces of the plurality of users from each other in each photo. In one embodiment, the predetermined criteria comprise one or more of an age of each photo, and comments associated with each photo. In one embodiment, the method also includes cropping the representative photo to include the plurality of users participating in the group activity. In one embodiment, the method also includes cropping the representative photo to include one or more significant background objects. In one embodiment, the method also includes cropping the representative photo to a predetermined shape. In one embodiment, the method also includes resizing the representative photo to a predetermined size.

In another embodiment, a method includes obtaining a plurality of photos associated with users participating in a group messaging thread, where the group messaging thread is at least one of a group text messaging thread, a group conversation thread, and a group email thread, where the plurality of photos is obtained from a social network, and where one or more of the photos have tags associated with the users. The method also includes selecting a representative photo from the plurality of photos, where the representative photo represents a group of the users, where the selecting of the representative photo comprises ranking the plurality of photos based on predetermined criteria, and where the predetermined criteria include one or more of a percentage of users in each photo who are associated with the group messaging thread, a proximity of faces of the users from each other in each photo, an age of each photo, and comments associated with each photo. The method also includes cropping the representative photo to a predetermined shape, and resizing the representative photo to a predetermined size. The method also includes associating the representative photo with the group messaging thread.

In another embodiment, a system includes one or more processors, and logic encoded in one or more tangible media for execution by the one or more processors. When executed, the logic is operable to perform operations that include obtaining a plurality of photos associated with a plurality of users participating in a group activity, selecting a representative photo from the plurality of photos, where the representative photo represents a group of the plurality of users, and associating the representative photo with the group of the plurality of users.

In one embodiment, the plurality of users are participating in a group messaging thread, and where the group messaging thread is at least one of a group text messaging thread, a group conversation thread, and a group email thread. In one embodiment, the plurality of photos is obtained from a social network. In one embodiment, one or more of the photos have tags associated with the plurality of users. In one embodiment, the selecting of the representative photo comprises ranking the plurality of photos based on predetermined criteria. In one embodiment, the predetermined criteria comprise a percentage of users in each photo who are associated with the group activity. In one embodiment, the logic when executed is further operable to perform operations comprising cropping the representative photo to include the plurality of users participating in the group activity.

DETAILED DESCRIPTION

Embodiments described herein provide a group identity for a group of users in a social network. As described in more detail below, a system provides a photographic representation of a group identity for a group participating in a group activity. In one embodiment, the server retrieves photos associated with users participating in a group activity such as participating in a group messaging thread. The group messaging thread may be, for example, a group text messaging thread, a group conversation thread, or a group email thread. In one embodiment, the server retrieves the photos from a social network, and the photos have tags associated with the users.

The server then selects a representative photo from the retrieved photos, where the representative photo represents a group of the users participating in the group activity. In one embodiment, the selecting of the representative photo may involve ranking the retrieved photos based on predetermined criteria. Such predetermined criteria may include one or more of the percentage of users in each photo who are associated with the group activity, the proximity of the faces of the users from each other in each photo, the age of each photo, and comments associated with each photo, and other criteria.

The server then crops the representative photo such that it contains primarily the faces of the users participating in the group activity. In one embodiment, the server may crop the representative photo to a predetermined shape such as a square. The server then resizes the representative photo to a predetermined size. The server then associates the representative photo with the group activity, and then causes the representative photo to be displayed in association with the group (e.g., in a group messaging thread).

Figure 1:
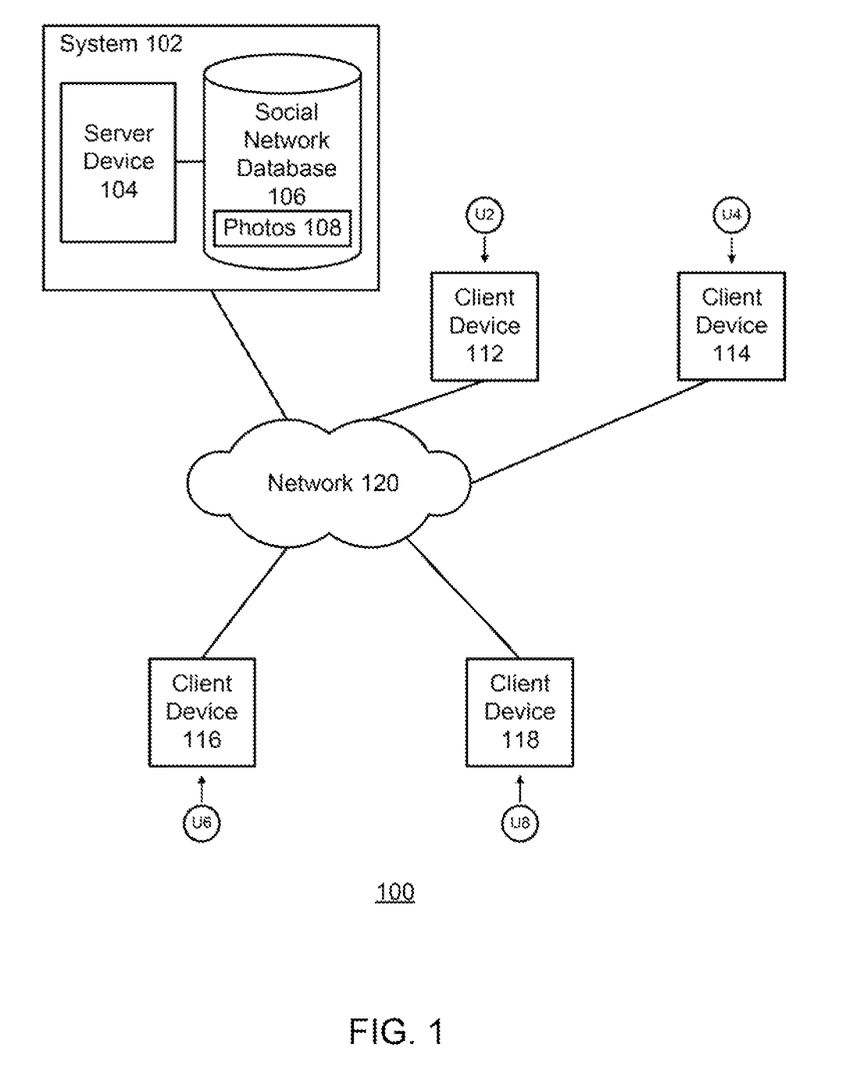
FIG. 1 illustrates a block diagram of an example network environment, which may be used to implement the embodiments described herein.

FIG. 1 illustrates a block diagram of an example network environment 100, which may be used to implement the embodiments described herein. In one embodiment, network environment 100 includes a system 102, which includes a server device 104 and a social network database 106. Network environment 100 also includes client devices 112, 114, 116, and 118, which may communicate with each other via system 102 and a network 120.

For ease of illustration, FIG. 1 shows one block for each of system 102, server device 104, and social network database 106, and shows four blocks for client devices 112, 114, 116, and 118. Blocks 102, 104, and 106 may represent multiple systems, server devices, and social network databases. Also, there may be any number of client devices. In other embodiments, network environment 100 may not have all of the components shown and/or may have other elements including other types of elements instead of, or in addition to, those shown herein.

In various embodiments, system 102 provides social network services; and users U2, U4, U6, and U8 may communicate with each other using respective client devices 112, 114, 116, and 118. For example, users U2, U4, U6, and U8 may interact with each other in a social network environment provided by system 102, where respective client devices 112, 114, 116, and 118 transmit messages to each other. Users U2, U4, U6, and U8 may communicate with each other individually and/or may participate in a group activities (e.g., participating in group messaging threads, etc.).

Figure 2:
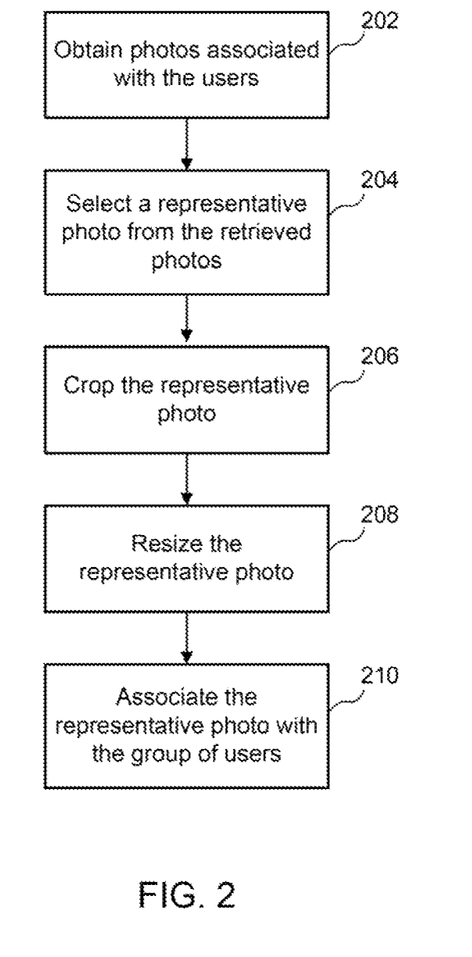
FIG. 2 illustrates an example simplified flow diagram for representing a group identity in a social network, according to one embodiment.

FIG. 2 illustrates an example simplified flow diagram for representing a group identity in a social network, according to one embodiment. Referring to both FIGS. 1 and 2, the method is initiated in block 202, where system 102 obtains photos associated with users participating in a group activity. In one embodiment, participation in a group activity may include being a members of a social network group, being members of a community or forum, being friends or colleagues who use a particular application or website, etc. In one embodiment, participation in a group activity may include attending an event, participating in an online forum or chat room or voice conference, etc. In one embodiment, participation in a group activity may include being in a shared group (e.g., a user-defined and shared list of users, a group of best friends, etc.). In one embodiment, participation in a group activity may include being tagged in a text-based status update. In one embodiment, participation in a group activity may include having access to access control list (ACL) scopes (e.g., online documents, spreadsheets, calendars, sites pages, photo albums, etc.). In one embodiment, participation in a group activity may include participating in a messaging thread (e.g. chat, email, text messaging, etc.). In one embodiment, the group messaging thread may be various types of messaging threads. For example, the group messaging thread may be a group text messaging thread, a group conversation thread, a group email thread, etc.

In one embodiment, system 102 obtains the photos from a social network. For example, in one embodiment, system 102 determines the users participating in the group activity. System 102 may then generate a query for photos associated with the users participating in the group activity. System 102 then sends the query to an appropriate social network to obtain the photos. In one embodiment, system 102 provides the social network, and server device 104 of system 102 queries social network database 106 for photos associated with the users. In another embodiment, server device 104 may query a social network provider external to system 102 for photos associated with the users.

In one embodiment, one or more of the photos may be associated with one or more particular users by having tags such as face tags associated with the users. For example, one photo may show users U2 and U4, where both users are tagged in the photo. Another photo may show user U2, where user U2 is tagged in the photo. Another photo may show users U2, U4, U6, and U8, where all users U2, U4, U6, and U8 are tagged in the photo. Such photos may be photos that users U2, U4, U6, and U8, and/or that any other users have uploaded into their respective photo albums in one or more social networks.

In one embodiment, one or more of the photos may be associated with one or more particular users by using a face recognition algorithm. For example, a given photo may show users U2 and U4, and both users U2 and U4 might not yet be tagged in the photo. In one embodiment, the face recognition algorithm may identify the faces in the photo and match each identified face with a known user in the social network database. As such, the photo with or without tags may be provided to system 102 in response to the query. Embodiments involving face recognition are described in more detail below.

In block 204, system 102 selects a representative photo from the photos, where the representative photo represents a group of the users. In one embodiment, system 102 selects the representative photo based on a ranking of the photos, where the ranking is based on predetermined factors/criteria. Embodiments involving rankings are described in more detail below.

In block 206, system 102 crops the representative photo such that it contains primarily the faces of the users (e.g., the users participating in a group messaging thread). In one embodiment, system 102 crops the representative photo to a predetermined shape (e.g., a square). In block 208, system 102 resizes the representative photo to a predetermined size (e.g., 64×64 pixels). Embodiments directed to cropping and resizing are described in more detail below.

In block 210, system 102 associates the representative photo with the group of the users (e.g., group of users participating in a group messaging thread). In one embodiment, system 102 causes the cropped and resized representative photo to be inserted in association with a group activity (e.g., inserted in a group messaging thread). For example, system 102 may transmit the representative photo along with a group messaging thread to the respective client devices of the users participating in the group messaging thread. In one embodiment, the representative photo may be inserted in a location where a profile photo of a single user might normally be inserted, in order to represent the group of participants and/or to represent the group messaging thread.

Figure 3:
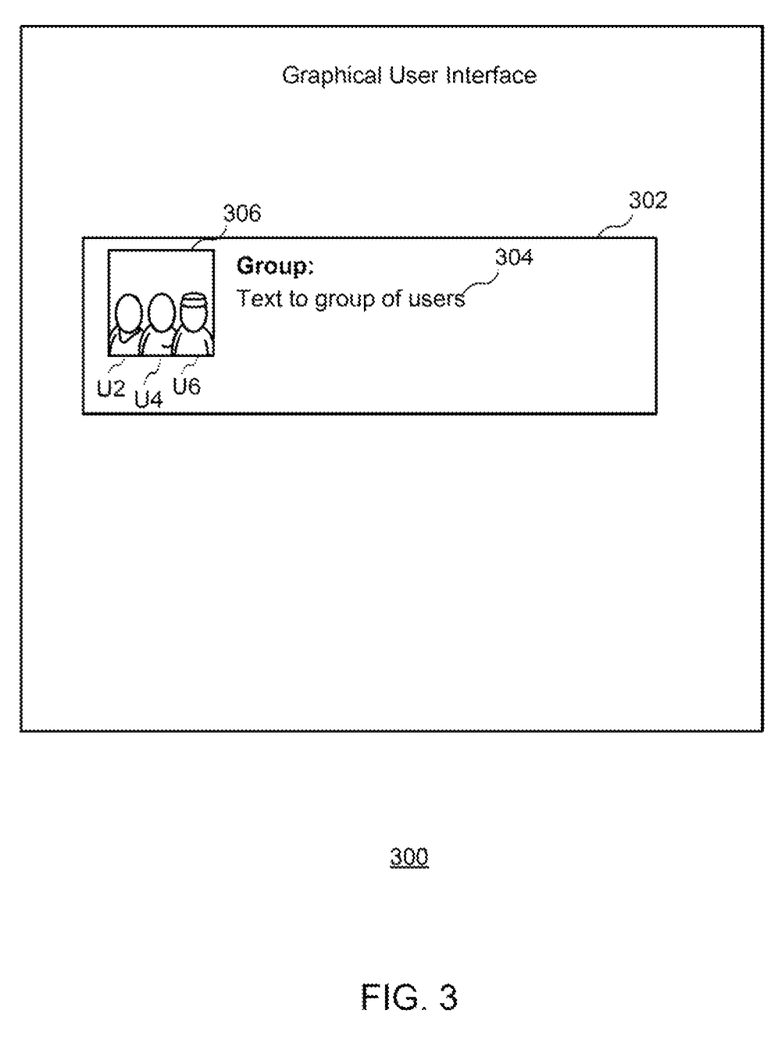
FIG. 3 illustrates an example graphical user interface, according to one embodiment.

FIG. 3 illustrates an example graphical user interface (GUI) 300, according to one embodiment. FIG. 3 shows GUI 300 and a group messaging thread 302, which contains text of a message 304 to the group. FIG. 3 also shows a representative photo 306 of a group of users U2, U4, and U6 participating in the group messaging thread 302. For ease of illustration, FIG. 3 shows one message 304. Group messaging thread 302 may contain multiple messages.

In various embodiments, user participants in a given group messaging thread may change over time. For example, one or more users (e.g., user U8, etc.) may join the group messaging thread, and one or more users (e.g., U6, etc.) may leave the group messaging thread 302. In one embodiment, system 102 may update representative photo 306 (e.g., replace representative photo 306 with a new representative photo) in order to accurately represent the actual/current user participants in the group messaging thread 302. In one embodiment, system 102 may update representative photo 306 based on any predetermined trigger. For example, in one embodiment, system 102 may update the representative photo 306 each time a user joins or leaves a group messaging thread. In one embodiment, system 102 may update the representative photo 306 periodically after any predetermined time period (e.g., every minute, every hour, every 2 hours, every day, etc.).

While system 102 is described as performing the steps as described in the embodiments herein, any suitable component or combination of components of system 102 or any suitable processor or processors associated with system 102 may perform the steps described.

Although the steps, operations, or computations may be presented in a specific order, the order may be changed in particular embodiments. Other orderings of the steps are possible, depending on the particular implementation. In some particular embodiments, multiple steps shown as sequential in this specification may be performed at the same time.

As indicated above, one or more of the photos may have face tags for one or more faces in each of the photos. In one embodiment, each face tag may be associated with a particular user identifier, which enables system 102 to associate the face in the photo with a specific user.

In one embodiment, where a given photo includes face tags, the face tags may indicate facial coordinates (e.g., where a corresponding face is located in the particular photo). In various embodiments, a user interface enables a user who tags a given photo to create a rectangle or box around each tagged face, where each box has associated facial coordinates (e.g., coordinates indicating the corners of each box). These facial coordinates enable system 102 to crop the photo accordingly. Embodiments involving cropping aspects are described in more detail below.

In one embodiment, system 102 may determine facial coordinates within the one or more photos using a face detection algorithm. For example, system 102 may pass the one or more photos through a face detection algorithm, and the face detection algorithm calculates coordinates of various visual elements of the photo (e.g., eyes, nose, ears, head, hair, etc.). System 102 may then provide a rectangle or box around each face in the photos.

In one embodiment, system 102 may select the representative photo 306 among all available photos based on a ranking algorithm. In various embodiments, system 102 may rank the photos based on one or more predetermined factors or criteria. For example, system 102 may rank photos based on the faces of the people in the photos. In one embodiment, system 102 may rank and select among photos based on a percentage of users in each photo who are participating in the group activity (e.g., associated with a group messaging thread). In one embodiment, system 102 may give a bias in favor of and select among photos that show the faces of exactly the set of users participating in the group activity, rather than a subset of (e.g., 2 out 3 faces of the users) or a superset (e.g., all faces of the 3 users in a group of 8 people). As a given database of photos grows, system 102 may select from many photos that have the exact set of users who are participating in the group activity. For example, over time, system 102 may select from tens, hundreds, or more candidate representative photos.

In one embodiment, system 102 may rank and select among photos based on the proximity of faces of the users from each other in each photo. For example, in one embodiment, among the candidate representative photos, system 102 may give a higher ranking to a photo showing user faces that would potentially occupy a larger region of the photo after being cropped (e.g., faces being closer together) versus a photo showing user faces that would occupy a smaller region (e.g., faces being farther apart, being at opposite ends of the photo, etc.). In one embodiment, system 102 may give a higher ranking to a photo having a higher ratio of pixels within a face tag boundary area to total number of pixels in the photo versus a photo with a lower ratio.

In various embodiments, system 102 may rank candidate representative photos based on other predetermined factors. For example, in one embodiment, system 102 may rank photos based on the age of the photos. For example, system 102 may give higher rankings to more recent photos versus older photos, or in some instances older photos versus recent photos.

In one embodiment, system 102 may give higher rankings to a photo that has received more attention from users in a social network. For example, system 102 may give a higher ranking to a photo that has been viewed more times, commented on more times, received gestures of endorsement (e.g., a user "favoriting," "liking," "hearting" the photo, etc.) more times, shared more times, re-shared more times, etc. versus a photo that has been viewed fewer times, commented on fewer times, receiving fewer gestures of endorsement, shared fewer times, re-shared fewer times, etc. These are some examples of factors, and, in various embodiments, system 102 may rank photos based on any one or more of the factors described herein, and others.

In one embodiment, system 102 may weigh one or more factors differently depending on the particular implementation. For example, system 102 may give more weight to photos that have exactly the set of users associated with the group activity versus photos that have a subset or superset of the users. In another example embodiment, system 102 may give more weight to photos that have received more attention from users (e.g., viewed more times, commented on more times, receiving gestures of endorsement more times, shared more times, re-shared more times, etc.). In one embodiment, system 102 may give more weight to photos that have received more attention specifically from the users associated with the group activity.

In various embodiments, basing the ranking on the one or more factors described herein, and basing the ranking on predetermined weighting, enables system 102 to optimally select one or more candidate representative photos. Such a selection is more likely to be a photo that the users associated with the group activity would find interesting or would believe to best represent the group identity or the group activity.

In one embodiment, system 102 may select multiple candidate representative photos and prompt a user to select one from the group of photos. In one embodiment, system 102 may provide the user with any predetermined number (e.g., 5, 10, 50, 100, etc.) of pre-cropped photos for the user to choose. In one embodiment, system 102 may also show a ranking for each of the candidate representative photos, which may facilitate the user in making a selection.

In one embodiment, system 102 may enable a user to override a single selection made by system 102 or override all candidate selections made by system 102, and enable the user to provide or select a particular photo that the user desires to use as the representative photo.

In one embodiment, system 102 may select the representative photo 306 among all available photos that include the users participating in the group activity. In one embodiment, system 102 may select the representative photo 306 among a subset of all available photos. For example, system 102 may consider the most recent photos that have been uploaded to the social network (or any other criteria such as those described herein).

In one embodiment, system 102 determines the region of the representative photo 306 that contains faces of people, and crops the representative photo 306 to contain primarily the faces of the users participating in the group activity (e.g., associated with the group messaging thread 302).

In one embodiment, system 102 crops the representative photo 306 based on existing coordinates of boxes associated with face tags, where the boxes frame the faces of the users. In one embodiment, system 102 crops the representative photo 306 such that multiple boxes (e.g., each containing a face) are contained within a predetermined shape (e.g., a square). In one embodiment, system 102 may crop the representative photo 306 based on a face recognition algorithm. Such an embodiment may be implemented, for example, if face tags in a given photo are not available.

In one embodiment, system 102 crops out people who are not among the users participating in the group activity and also crops out background landscaping. This provides a representative photo 306 that optimally displays the users (e.g., U2, U4, and U6) associated with the group activity. In one embodiment, system 102 performs the cropping, leaving a predetermined amount of space between the faces and the edge of the photo in order to ensure that faces of the users participating in the group activity are not cropped out. System 102 may perform the cropping using face tag positions and/or a face recognition algorithm.

In one embodiment, a photo may be pre-cropped in order for system 102 to determine if the photo would be a good candidate representative photo. For example, system 102 may determine whether the faces in the pre-cropped photo show well compared to the same faces in other photos.

As indicated above, in one embodiment, system 102 crops the representative photo 306 to a predetermined shape. For example, a given photo may initially be rectangular (e.g., a 4×3 aspect ratio), and system 102 may crop the photo to a square (e.g., a 3×3 aspect ratio) or any other predetermined shape, depending on the particular implementation. In one embodiment, the predetermine shape may be a default shape (e.g., a square). In one embodiment, system 102 may enable the user to select the predetermined shape (e.g., square, rectangle, circle, oval, star, etc.).

In one embodiment, system 102 may crop photos to include predetermined background objects. In one embodiment, a predetermined background object may include landmarks that may be significant or of interest to the users. For example, if the user participants are users U2, U4, and U6, and these users were in front of a pyramid (or other interesting landmark), system 102 may include the pyramid in the representative photo. Other landmarks and objects are possible (e.g., famous buildings, natural monuments, sculptures, etc.).

In one embodiment, where system 102 selects multiple candidate representative photos, and where it may not be certain whether a particular background object would be significant to the users, system 102 may include the photo in question among the pool of candidate representative photos to the user for possible selection.

In one embodiment, system 102 may utilize an image recognition algorithm to recognize potentially significant background objects to include in a candidate representative photo. For example, system 102 may compare a background object in a photo to known objects in a database to determine if system 102 recognizes the background object. If the there is a match, system 102 may select the photo as a candidate representative photo based on the photos and at least in part based on the background object. In various embodiments, a given photo may already have a tag with geolocation information, which system 102 may use to ascertain the significance of any background images. For example, system 102 may determine that a particular background object is significant, because it has the shape of a pyramid and the photo was taken in Egypt. In these scenarios, system 102 would crop the representative photo 306 to include the background object with the faces of the users.

As indicated above, in one embodiment, system 102 resizes the representative photo 306 to a predetermined shape. In various embodiments, system 102 may resize the representative photo based on the particular device that displays the representative photo in association with the group activity (e.g., in a group messaging thread). For example, system 102 may resize the representative photo to smaller size for a small device (e.g., a small display screen on a mobile device) and may resize the representative photo to larger size for a larger device (e.g., a larger display screen for a desktop computer).

While some embodiments herein have been described in the context of group messaging threads, embodiments may apply to other group activities in social communication environments such as pages and functionality in a social network system. For example, as indicated above, system 102 may select and associate a representative photo to any user-specified messaging group, contact group, friendship group, discussion group, conversion group, group video conference, persistent messaging threads, etc., in a social media context. For example, in various embodiments, system 102 may select and associate a representative photo with any webpage or window associated with a group. In one embodiment, system 102 may cause a representative photo to be display in any predetermined location in a webpage (e.g., associated with a group of friends or any group). Embodiments described herein may be implemented in applications for mobile devices (e.g., mobile phones, touch pads, notebook computers) and other devices such as desktop computers.

Embodiments described herein provide various benefits. For example, the system may provide a representative photo for a given group messaging thread without requiring any or requiring minimal user action. Embodiments described herein also increase overall engagement among end-users in a social networking environment by providing a group identity or group messaging thread identity.

Figure 4:
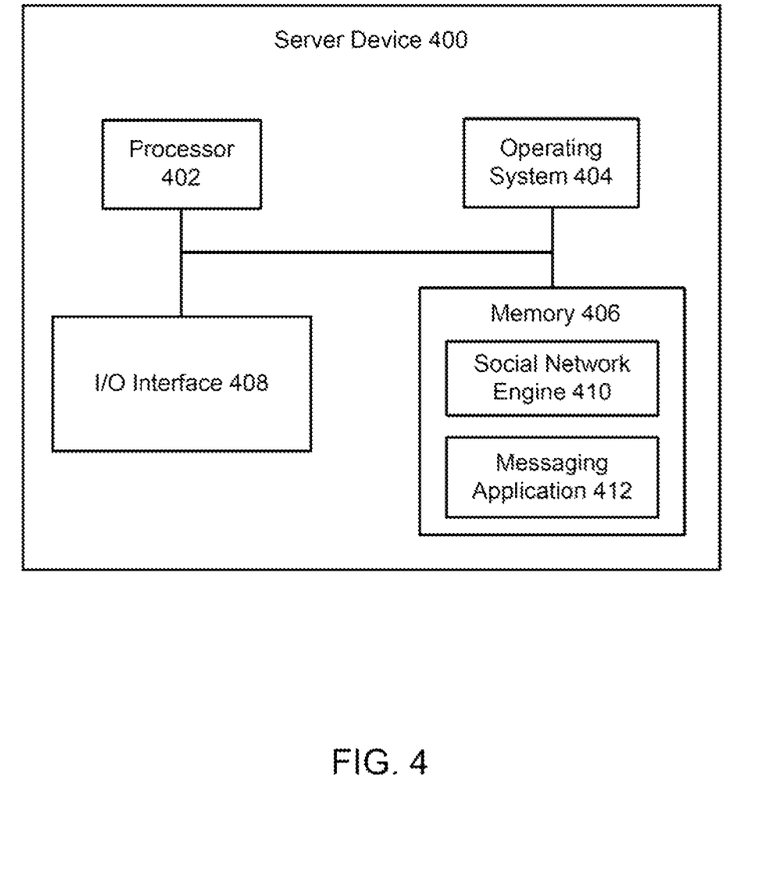
FIG. 4 illustrates a block diagram of an example server device, which may be used to implement the embodiments described herein.

FIG. 4 illustrates a block diagram of an example server device 400, which may be used to implement the embodiments described herein. For example, server device 400 may be used to implement server device 104 of FIG. 1, as well as to perform the method embodiments described herein. In one embodiment, server device 400 includes a processor 402, an operating system 404, a memory 406, and input/output (I/O) interface 408. Server device 400 also includes a social network engine 410 and a messaging application 412, which may be stored in memory 406 or on any other suitable storage location or computer-readable medium. Messaging application 412 provides instructions that enable processor 402 to perform the functions described herein and other functions.

For ease of illustration, FIG. 4 shows one block for each of processor 402, operating system 404, memory 406, social network engine 410, messaging application 412, and I/O interface 408. These blocks 402, 404, 406, 408, 410, and 412 may represent multiple processors, operating systems, memories, I/O interfaces, social network engines, and messaging applications. In other embodiments, server device 400 may not have all of the components shown and/or may have other elements including other types of elements instead of, or in addition to, those shown herein.

Although the description has been described with respect to particular embodiments thereof, these particular embodiments are merely illustrative, and not restrictive. Concepts illustrated in the examples may be applied to other examples and embodiments.

Note that the functional blocks, methods, devices, and systems described in the present disclosure may be integrated or divided into different combinations of systems, devices, and functional blocks as would be known to those skilled in the art.

Any suitable programming language and programming techniques may be used to implement the routines of particular embodiments. Different programming techniques may be employed such as procedural or object-oriented. The routines may execute on a single processing device or multiple processors. Although the steps, operations, or computations may be presented in a specific order, the order may be changed in different particular embodiments. In some particular embodiments, multiple steps shown as sequential in this specification may be performed at the same time.

A "processor" includes any suitable hardware and/or software system, mechanism or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

What is claimed is:

1. A computer-implemented method using one or more computer processors to perform operations comprising:
    obtaining a plurality of photos associated with users participating in a group messaging thread, wherein the group messaging thread is at least one of a group text messaging thread, a group conversation thread, and a group email thread, wherein the plurality of photos is obtained from a storage location associated with one or more users in a social network, and wherein one or more of the photos have tags associated with the users;
    selecting a representative photo from the plurality of photos, wherein the representative photo represents a group of the users, wherein the selecting of the representative photo comprises ranking the plurality of photos based on predetermined criteria, and wherein the predetermined criteria include one or more of a percentage of users in each photo who are associated with the group messaging thread, a proximity of faces of the users from each other in each photo, an age of each photo, and comments associated with each photo;
    cropping the representative photo to a predetermined shape;
    resizing the representative photo to a predetermined size;
    associating the representative photo with the group messaging thread; and
    displaying the representative photo in a location associated with the group messaging thread.

2. The method of claim 1, further comprising updating the representative photo based on one or more predetermined conditions.

3. The method of claim 1, further comprising applying a facial recognition algorithm to one or more faces in the photos if one or more corresponding tags are not available.

4. The method of claim 1, further comprising cropping the representative photo to include the plurality of users participating in the group messaging thread.

5. The method of claim 1, further comprising cropping the representative photo to include one or more significant background objects.

6. The method of claim 1, further comprising presenting the representative photo to a user for user selection.

7. A system comprising:
    one or more processors; and
    logic encoded in one or more tangible, non-transitory computer-readable storage media for execution by the one or more processors and when executed operable to perform operations comprising:
        obtaining a plurality of photos associated with users participating in a group messaging thread, wherein the group messaging thread is at least one of a group text messaging thread, a group conversation thread, and a group email thread, wherein the plurality of photos is obtained from a storage location associated with one or more users in a social network, and wherein one or more of the photos have tags associated with the users;
        selecting a representative photo from the plurality of photos, wherein the representative photo represents a group of the users, wherein the selecting of the representative photo comprises ranking the plurality of photos based on predetermined criteria, and wherein the predetermined criteria include one or more of a percentage of users in each photo who are associated with the group messaging thread, a proximity of faces of the users from each other in each photo, an age of each photo, and comments associated with each photo;
        cropping the representative photo to a predetermined shape;
        resizing the representative photo to a predetermined size;
        associating the representative photo with the group messaging thread; and
        displaying the representative photo in a location associated with the group messaging thread.

8. The system of claim 7, wherein the logic when executed is further operable to perform operations comprising cropping the representative photo to include the plurality of users participating in the group messaging thread.

\* \* \* \* \*